(12) United States Patent
Baggio et al.

(10) Patent No.: US 11,993,463 B2
(45) Date of Patent: May 28, 2024

(54) CONVEYOR IDLER MONITORING APPARATUS, SYSTEMS, AND METHODS

(71) Applicant: Superior Industries, Inc., Morris, MN (US)

(72) Inventors: Osvaldo Baggio, Sao Paolo (BR); Eduardo Martinelli, Sao Paolo (BR)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 18/160,171

(22) Filed: Jan. 26, 2023

(65) Prior Publication Data

US 2023/0271787 A1     Aug. 31, 2023

Related U.S. Application Data

(63) Continuation of application No. 17/290,449, filed as application No. PCT/US2019/058975 on Oct. 30, 2019, now Pat. No. 11,608,230.

(60) Provisional application No. 62/753,029, filed on Oct. 30, 2018.

(51) Int. Cl.
*B65G 43/02* (2006.01)
*B65G 39/09* (2006.01)

(52) U.S. Cl.
CPC ............ *B65G 43/02* (2013.01); *B65G 39/09* (2013.01); *B65G 2203/0275* (2013.01); *B65G 2203/0291* (2013.01); *B65G 2203/041* (2013.01); *B65G 2203/045* (2013.01); *B65G 2203/048* (2013.01)

(58) Field of Classification Search
None
See application file for complete search history.

(56) References Cited

U.S. PATENT DOCUMENTS

| 5,970,712 A | 10/1999 | Stein | |
| 6,147,619 A * | 11/2000 | El-Ibiary | F16C 19/52 340/686.3 |
| 6,324,899 B1 | 12/2001 | Discenzo | |

(Continued)

FOREIGN PATENT DOCUMENTS

| AU | 2015100473 | 5/2015 |
| AU | 2016245324 | 10/2017 |

(Continued)

OTHER PUBLICATIONS

"CN First Office Action", CN Application No. 201880075747.X, dated Jun. 22, 2021, 3 pages.

(Continued)

*Primary Examiner* — Kavel Singh
(74) *Attorney, Agent, or Firm* — Todd R. Fronek; Larkin Hoffman Daly & Lindgren, Ltd.

(57) ABSTRACT

Conveyor idler monitoring apparatus, systems and methods are provided. In some embodiments, one or more sensors (e.g., temperature sensors, load sensors, etc.) are supported by the shaft of a conveyor idler. In some embodiments, one or more sensors are in data communication with a wireless transmitter. In some embodiments, a power generator driven by rotation of the idler is in electrical communication with one or more sensors and/or a wireless transmitter. In some embodiments, idler monitoring systems are in data communication with a conveyor monitoring system and/or operational monitoring system.

9 Claims, 13 Drawing Sheets

(56) References Cited

U.S. PATENT DOCUMENTS

| | | | |
|---|---|---|---|
| 6,986,418 B2* | 1/2006 | Swinderman | B65G 45/12 |
| | | | 198/502.1 |
| 7,034,711 B2 | 4/2006 | Sakatani | |
| 7,131,525 B2 | 11/2006 | Swinderman et al. | |
| 7,673,739 B2 | 3/2010 | Freeman | |
| 7,839,294 B2 | 11/2010 | Orlowski et al. | |
| 9,371,630 B1 | 6/2016 | Johannsen | |
| 10,302,501 B2 | 4/2019 | Lysen et al. | |
| 10,810,687 B2* | 10/2020 | Bidram | G06Q 10/06393 |
| 11,199,837 B2* | 12/2021 | Cella | G05B 19/4185 |
| 2003/0168317 A1 | 9/2003 | Fromme et al. | |
| 2005/0034902 A1 | 2/2005 | Madhavarao et al. | |
| 2007/0215391 A1 | 9/2007 | Wineland | |
| 2009/0194390 A1 | 8/2009 | Freeman | |
| 2010/0013654 A1 | 1/2010 | Williams et al. | |
| 2010/0072813 A1 | 3/2010 | McRae et al. | |
| 2016/0261168 A1 | 9/2016 | Harrison | |
| 2017/0370803 A1* | 12/2017 | Moutsouriz | B65G 43/02 |
| 2018/0248983 A1 | 8/2018 | Mohebbi et al. | |

FOREIGN PATENT DOCUMENTS

| | | |
|---|---|---|
| CN | 1798962 | 7/2006 |
| CN | 201514317 | 6/2010 |
| CN | 107235288 | 10/2017 |
| DE | 29621357.8 U1 | 1/1998 |
| DE | 102018104792 A1 | 9/2019 |
| IT | UB20155386 A1 | 5/2017 |
| SE | 1051104 | 4/2012 |
| WO | 03059789 | 7/2003 |
| WO | 2012057680 A1 | 5/2012 |
| WO | 2015042661 A2 | 4/2015 |
| WO | 2016019431 A1 | 2/2016 |
| WO | 2016115591 A1 | 7/2016 |
| WO | 2016161473 A1 | 10/2016 |
| WO | 2018119235 A1 | 6/2018 |
| WO | 2019166415 A1 | 9/2019 |

OTHER PUBLICATIONS

"Extended European Search Report", EP Application No. 18873288.7, dated Jul. 16, 2021, 10 pages.

"International Search Report and Written Opinion", International Bureau, Application No. PCT/US2018/058302, dated Jan. 17, 2019, 15 pages.

"International Search Report and Written Opinion", International Bureau, Application No. PCT/US2019/058975, dated Mar. 19, 2020, 19 pages.

Cooper, "Sensor Platform for Monitoring Conveyor Belt Rollers," University of Southern Queensland Faulty of Health, Engineering & Sciences, dated Oct. 2015[retrieved on Nov. 21, 2022], retrieved from URL <https://eprints.usq.edu.au/29187/1/Cooper_D_Billingsley.pdf>, 87 pages.

Liu, "Prediction of belt conveyor idler performance," TRAIL Research School, dated Sep. 2016[retrieved on Nov. 21, 2022], retrieved from URL <https://pure.tudelft.nl/ws/portalfiles/portal/6138598/dissertation_Xiangwei_online_version_20160903.pdf>, 189 pages.

Brazil Office Action in Brazil Application No. BR112020008698-3, dated Sep. 20, 2022, 7 pages.

Chinese Office Action in Chinese Application No. 201980073971.X, dated Jul. 4, 2022, 15 pages.

Australian Office Action in Australian Application No. 2018360571, dated Sep. 13, 2023, 4 pages.

European Communication in European Application No. 18 873 288.7, dated Oct. 24, 2023, 4 pages.

* cited by examiner

```
ıll VIVO                    17:58                    ◆ ▬
                                                              ← 1500
    ←           Equipment            🔍

SHD > Usina > TR-2011KS-08  ←———— 1506

Sections

1                                              ⌃

Idler 1
                                                    ← 1510
    ⬚  00 1A 00 01                      R001

Left    0 C    Tube      0 C    Load    0kg
    Right   0 C    Rotation  0rpm

Idler 2
                                                    ← 1520
    ⬚  00 1A 00 02                      R002

Left    55 C   Tube      28 C   Load    257kg
    Right   42 C   Rotation  471rpm Idler 3
                                                    ← 1530
    ⬚  00 1A 00 03                      R003

Left    0 C    Tube      0 C    Load    0kg
    Right   0 C    Rotation  0rpm

Idler 4
```

FIG. 15

CONVEYOR IDLER MONITORING APPARATUS, SYSTEMS, AND METHODS

BRIEF DESCRIPTION OF THE DRAWINGS

FIG. 15 illustrates an embodiment of a user interface screen.

DESCRIPTION

Figure 1:
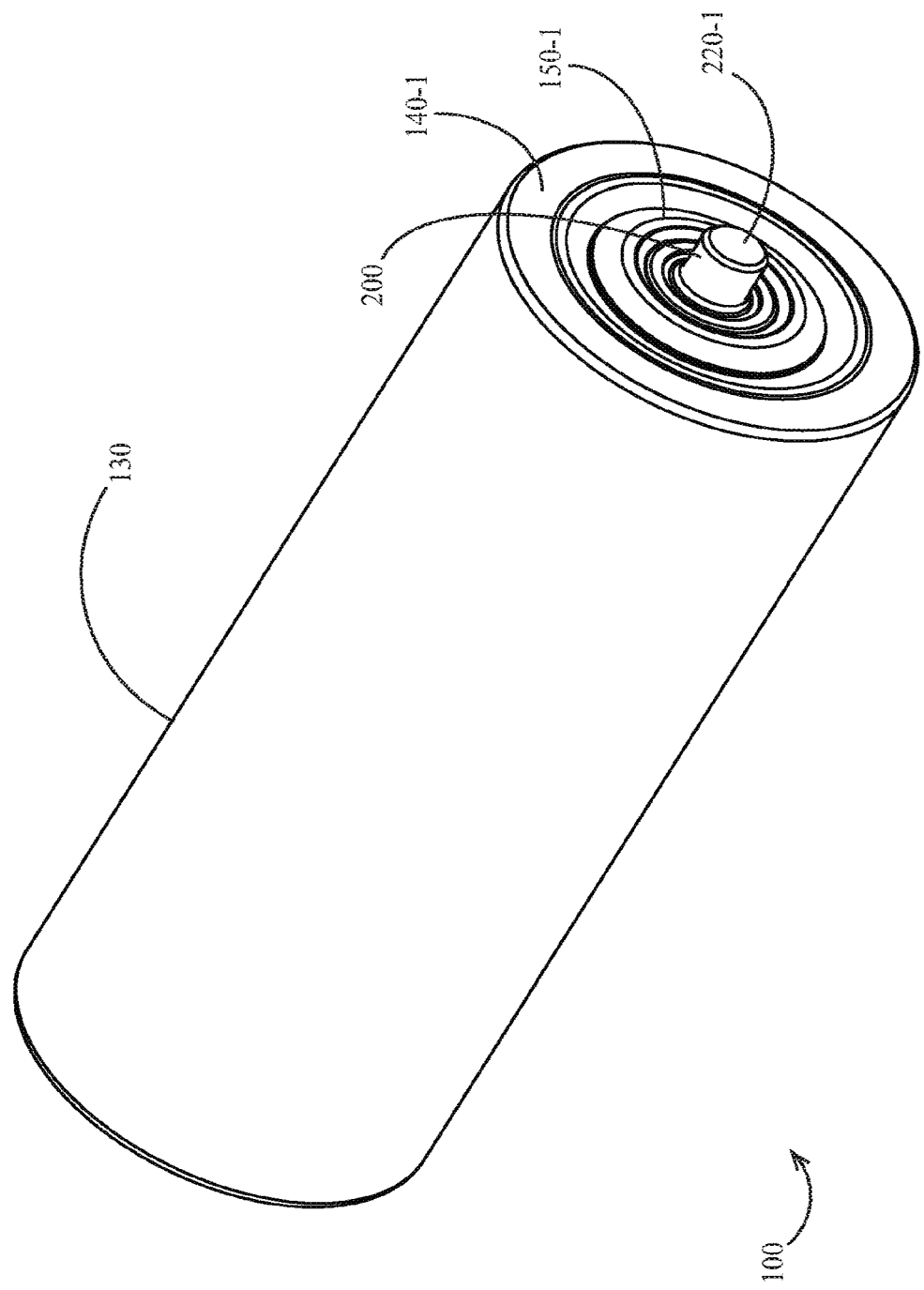
FIG. 1 is a perspective view of an embodiment of a conveyor idler.
Figure 2:
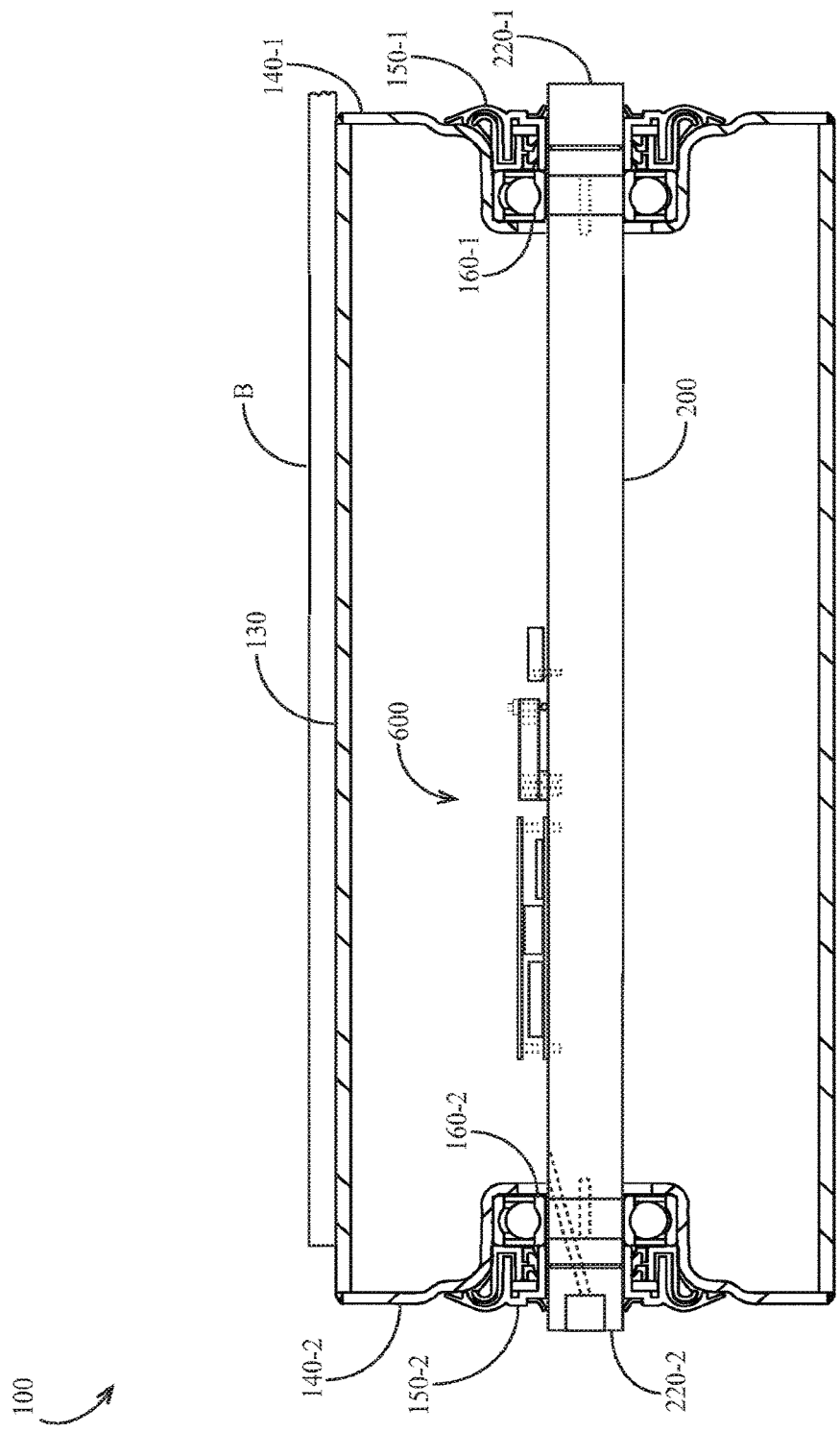
FIG. 2 is a cutaway side elevation view of the conveyor idler of FIG. 1.

Referring to the drawings, wherein like reference numerals designate identical or corresponding parts throughout the several views, FIGS. 1 and 2 illustrate an embodiment of a conveyor idler 100. The conveyor idler 100 includes a cylinder 130 rollingly supported on a shaft 200. The shaft 200 is supported (e.g., in a stationary manner) on a conveyor. The cylinder 130 is configured to at least partially support a conveyor belt B.

The idler 100 optionally includes end discs 140-1, 140-2 disposed at opposing ends of the shaft 200 and mounted to opposing ends 220-1, 220-2 of the cylinder 130. Each end disc is optionally supported on an associated bearing 160 (e.g., ball bearing). A seal assembly 150 is optionally disposed outboard of each bearing assembly to at least partially prevent external liquid and/or debris from entering an interior volume of the idler 100.

Referring to FIG. 2, a monitoring system 600 (e.g., one of the monitoring system embodiments described herein) is optionally at least partially supported on the shaft 200.

Figure 3:
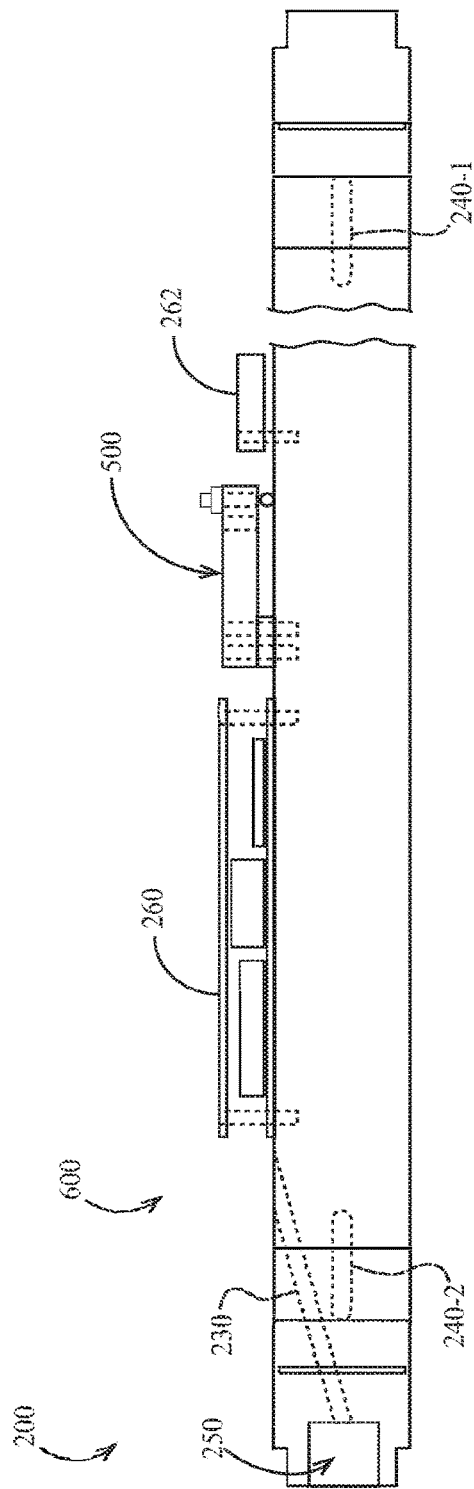
FIG. 3 is a side elevation view of an embodiment of an idler shaft.
Figure 4:
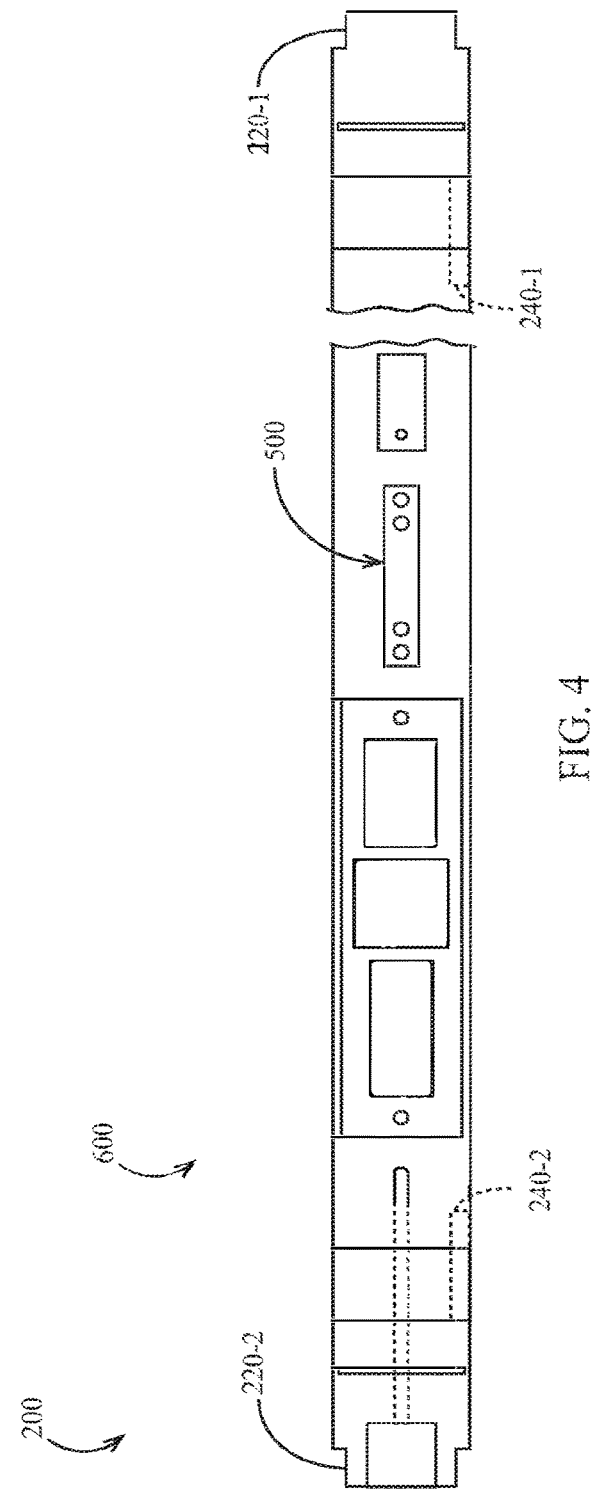
FIG. 4 is a top elevation view of the idler shaft of FIG. 3.

Referring to FIGS. 3 and 4, one or more mounting boards 260, 262 are optionally mounted to the shaft 200 for supporting one or more electronic components of the monitoring system 600. In some embodiments, a load sensor 500 is supported on (e.g., mounted to the shaft 200). In some embodiments, a cavity 250 is provided in an end 220 of the shaft 200 for housing a transmitter and/or other components of the monitoring system. An opening 230 is optionally provided in the shaft for at least partially receiving one or more electrical connectors (e.g., wire, cable, etc.) which optionally connect the transmitter to the load sensor 500 and/or other components supported on the shaft 200 (e.g., on mounting board 260). In some embodiments, a transmitter is at least partially received in the cavity 250. In alternative embodiments, a cavity 250 may be omitted and the transmitter is optionally mounted on the end 220 of the shaft or elsewhere on the idler and/or conveyor.

In some embodiments, one or more cavities 240 are provided adjacent to (e.g., radially inward of) the bearing 160. In some embodiments, each cavity 240 is provided in a radially outer surface of the shaft 200. In some embodiments, a temperature sensor 635 (e.g., resistance temperature detector, thermocouple, etc.) is at least partially received in one or more cavities 240.

Figure 5:
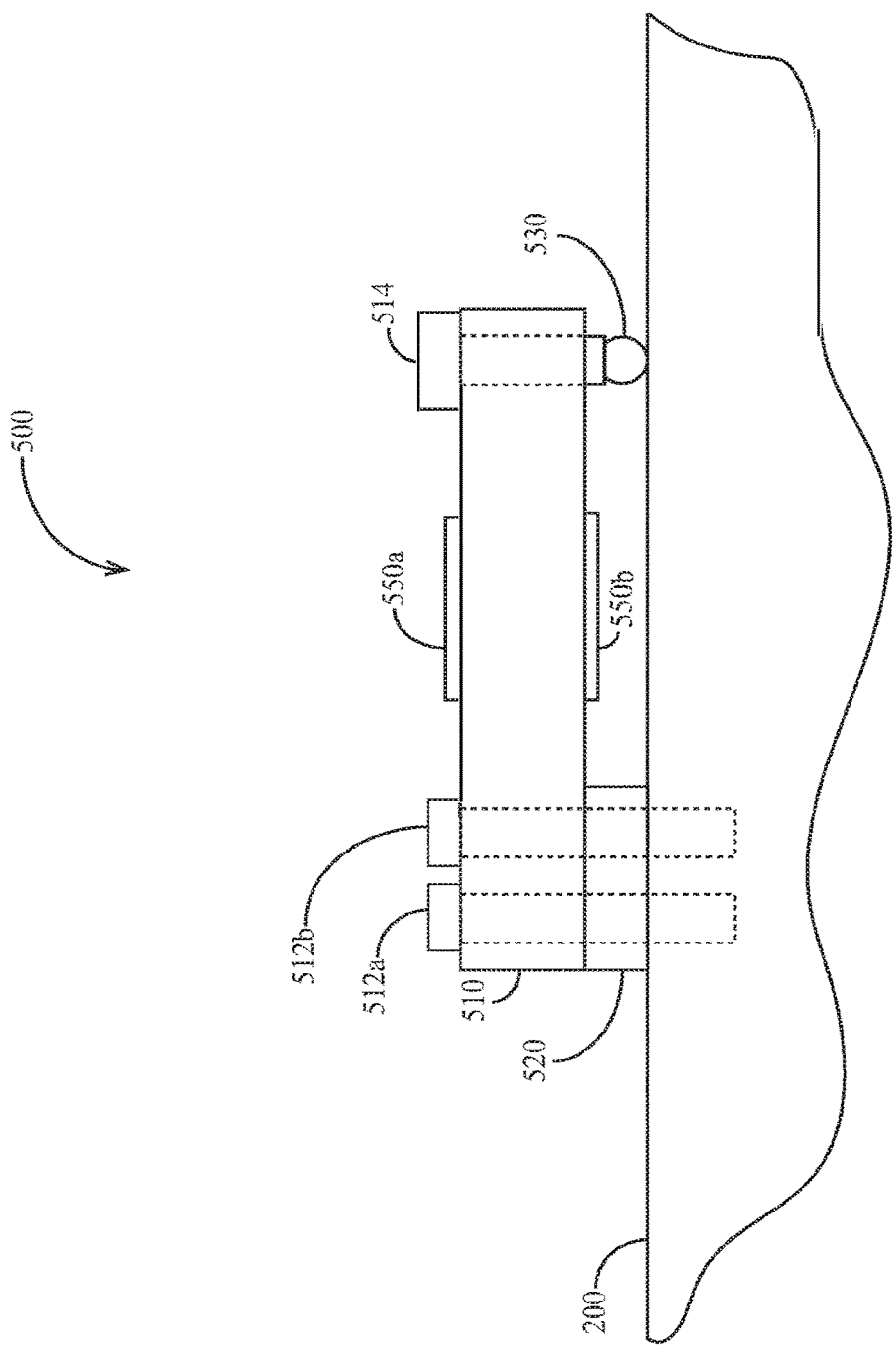
FIG. 5 is a side elevation view of an embodiment of a load sensor.

Referring to FIG. 5, an embodiment of a load sensor 500 is illustrated. The load sensor 500 optionally includes a deflector arm 510. One or more strain gauges 550 are optionally mounted to the deflector arm (e.g., in a Wheatstone bridge or other arrangement). The deflector arm 510 is optionally mounted to the shaft 200 (e.g., an upper surface of the shaft, disposed between the shaft and the conveyor belt, etc.) such as by one or more bolts 512. The deflector arm 510 is optionally spaced apart (e.g., vertically spaced apart) from the shaft 200 by a spacer 520. A bolt 514 or other apparatus optionally applies a load between the deflector arm 510 and the shaft 200. A rounded lower surface 530 (e.g., a ball) optionally at least partially transfers a load between the deflector arm 510 and the shaft 200. The bolt 514 is optionally adjustable in order to increase or decrease the load on the lower surface 530. The rounded lower surface 530 is optionally located at or near an axial midpoint of the shaft 200 (e.g., at or near a location equidistant to the ends 220-1, 220-2). Deflection of the shaft 200 optionally changes a deflection of the deflector arm 510 such that one or more strain gauges 550 generate a modified strain signal related to the amount of deflection of the shaft 200.

Figure 6:
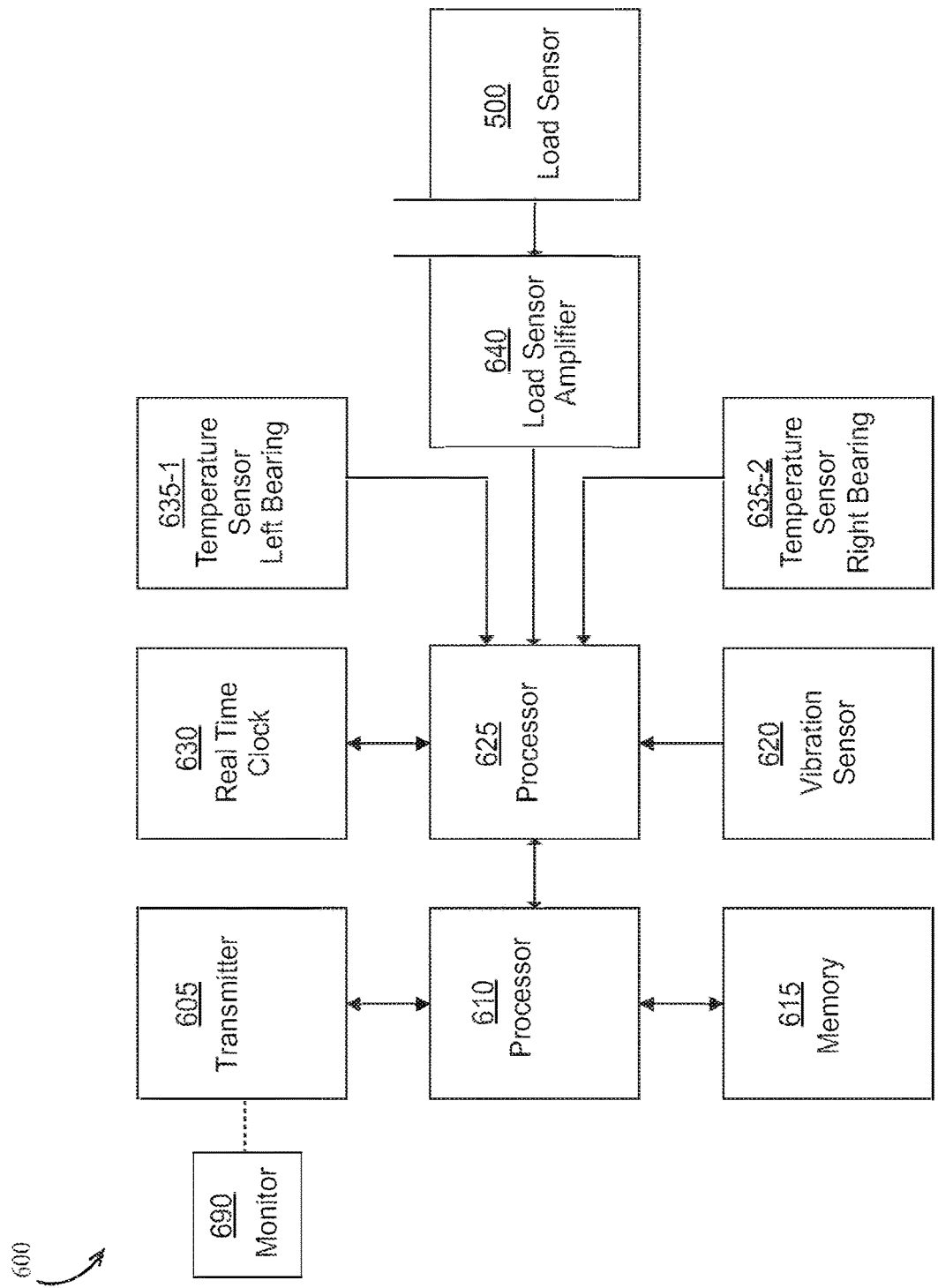
FIG. 6 schematically illustrates an embodiment of an idler monitoring system.

Referring to FIG. 6, an embodiment of a monitoring system 600 is schematically illustrated. The load sensor 500 (e.g., a load cell and/or strain gauge thereof) is optionally in data communication with a processor 625 (e.g., optionally via an amplifier 640 which is optionally configured to convert an analog signal to a digital signal). One or more temperature sensors 635 are optionally in data communication with the processor 625. A vibration sensor 620 (e.g., optionally mounted to the shaft 200) is optionally in data communication with the processor 625. A real time clock 630 is optionally in data communication with the processor 625. The processor 625 optionally transmits signals (e.g., at least partially processed signals) from the various sensors to a processor 610 in data communication with the processor 625. The processor 610 is optionally in data communication with a memory 615 (e.g., SD card or other memory). The processor 610 is optionally in fluid communication with a transmitter 605 (e.g., antenna). The transmitter 605 optionally comprises a wireless transmitter (e.g., a WiFi interface access point). The transmitter 605 is optionally at least partially disposed in the cavity 250. The transmitter 605 is optionally in data communication (e.g., wireless communication) with a monitor 690. The monitor 690 optionally comprises a graphical user interface. In some embodiments, the monitor 690 comprises a mobile computing device such as a consumer computing device (e.g., smart phone, tablet, laptop, etc.).

Figure 7:
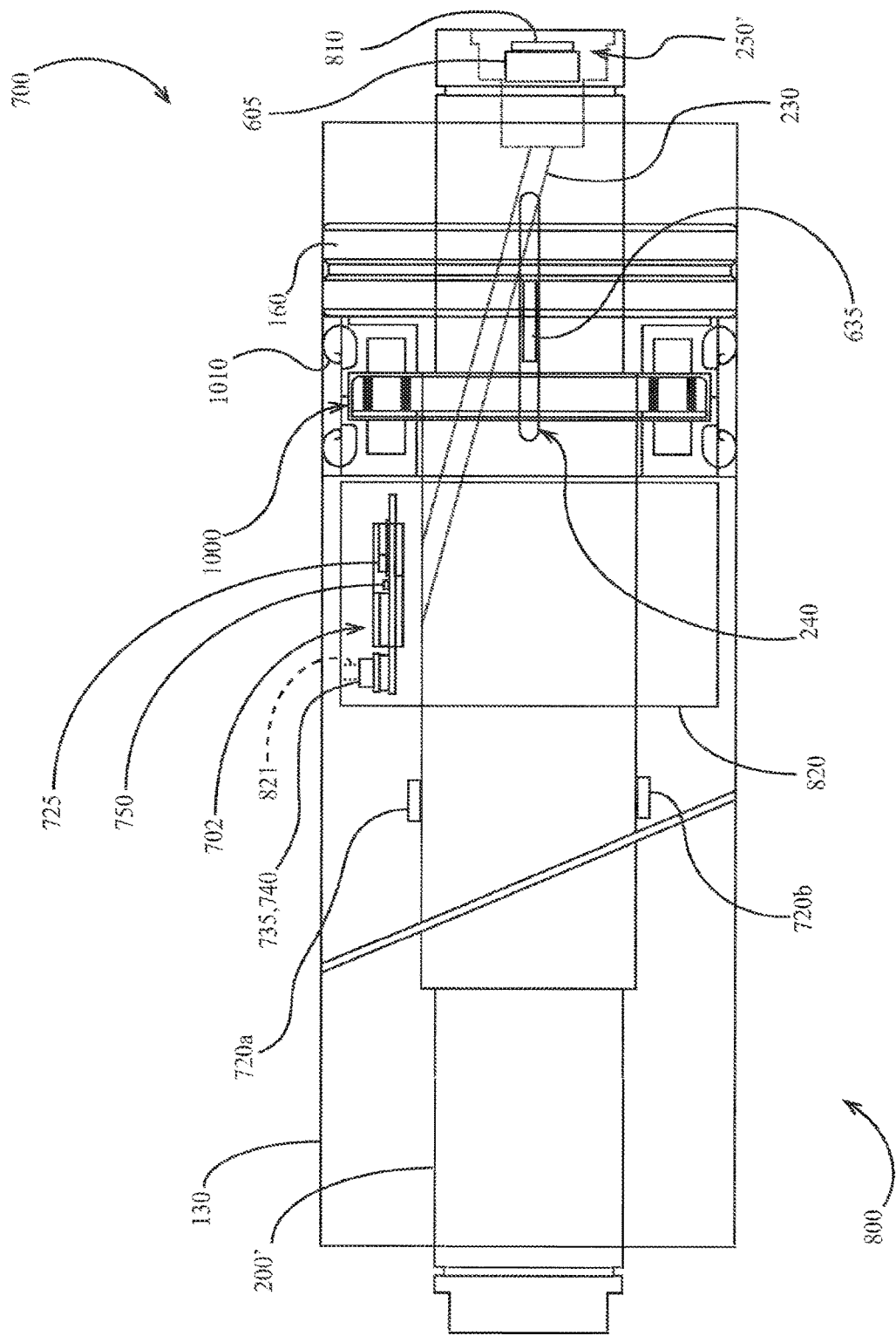
FIG. 7 is a cutaway front elevation view elevation view of another embodiment of a conveyor idler.
Figure 8:
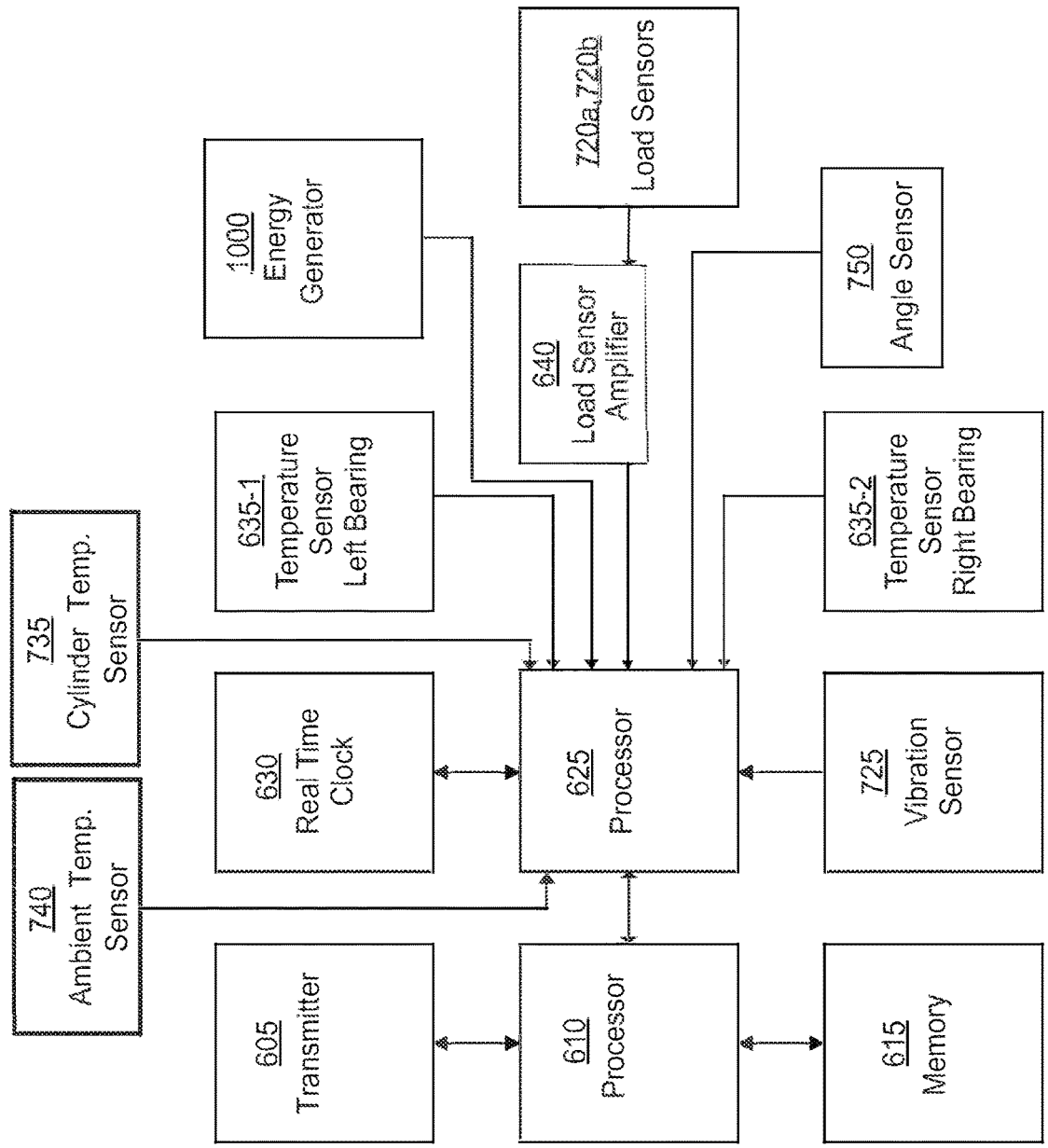
FIG. 8 schematically illustrates another embodiment of an idler monitoring system.

Referring to FIGS. 7 and 8, another embodiment of a conveyor idler 800 and an associated (e.g., incorporated) idler monitoring system 700 are illustrated. The idler 800 is optionally generally similar to one or more of the other idler embodiments described herein; in some embodiments the idler 800 includes an optionally modified shaft 200' rollingly supporting the cylinder 130. An optionally modified cavity 250' (e.g., in or adjacent to shaft 200') optionally at least partially houses a transmitter 605. The idler 800 optionally includes an identifier 810 (e.g., RFID tag or QR code) which may be provided at or adjacent to the end of shaft 200'. A sensor housing 820 (e.g., generally annular housing) is optionally mounted to the shaft 200', e.g., optionally inside the cylinder 130 and optionally between bearings 160.

As illustrated in FIG. 8, the idler monitoring system 700 optionally includes one or more components described as part of the previously described system 600 (e.g., transmitter 605, clock 630, processor 610, processor 625, memory 615, load sensor amplifier 640, bearing temperature sensors 635). The idler monitor system 700 also optionally includes one or more additional devices in data communication with transmitter 605, e.g., one or more load sensors 720, a vibration sensor, an energy generator 1000, a cylinder temperature sensor 735, an ambient temperature sensor 740, and angle sensor 750. In some embodiments, one or more of the sensors (e.g., sensors 735, 740, and/or 750) are mounted to a circuit board 702 which may also support one or more components described as part of the previously described system 600 (e.g., clock 630, processor 610, processor 625, memory 615, load sensor amplifier 640, etc.). The circuit board 702 is optionally supported on (and/or is optionally at least partially housed in) the housing 820.

One or more load sensors 720 optionally comprise strain gauges mounted directly to the shaft 200'. In some embodiments the load sensors 720 are mounted to a curved (e.g., cylindrical) surface of the shaft; in other embodiments, one or more load sensors are mounted to a machined flat in the shaft and/or a flat surface supported on the shaft. In some embodiments, a first load cell 720a is mounted at a first location on the shaft 200' and a second load cell 720b is mounted at a second location on the opposite side of the shaft. In some embodiments, load cells 720a, 720b are mounted at the same or similar distance from an end of the shaft, such as at or adjacent to the transverse center of the shaft).

One or more vibration sensors 725 are configured to detect vibration of the idler (e.g., of the bearing 160) and generate a corresponding signal and/or corresponding data to a processor and/or to the transmitter. In some embodiments, the vibration sensor 725 comprises a noise sensor (e.g., an electret microphone). In some embodiments, one or more vibration sensors 725 are in contact with a bearing 160.

One or more cylinder temperature sensors 735 are optionally configured and positioned to detect the temperature of an inner surface of cylinder 130. In some embodiments, the sensor 735 comprises an infrared temperature sensor optionally oriented toward the inner surface of cylinder 130. In some embodiments, the sensor 735 is at least partially housed in housing 820 and an opening 821 is optionally provided in the housing 820 between the sensor 735 and the inner surface of cylinder 130.

One or more ambient air temperature sensors 740 (resistance temperature detector, etc.) are optionally configured and positioned to detect the temperature of ambient air inside the idler.

One or more angle sensors 750 (e.g., accelerometers, etc.) are optionally configured and positioned to generate a signal related to an orientation of the idler (e.g., the idler shaft) relative to horizontal. It should be appreciated that in troughing idler assembly embodiments, the idlers installed in the left, right and center of the assembly may have differing orientations which may be used to identify where the idler is installed on the assembly.

Figure 10:
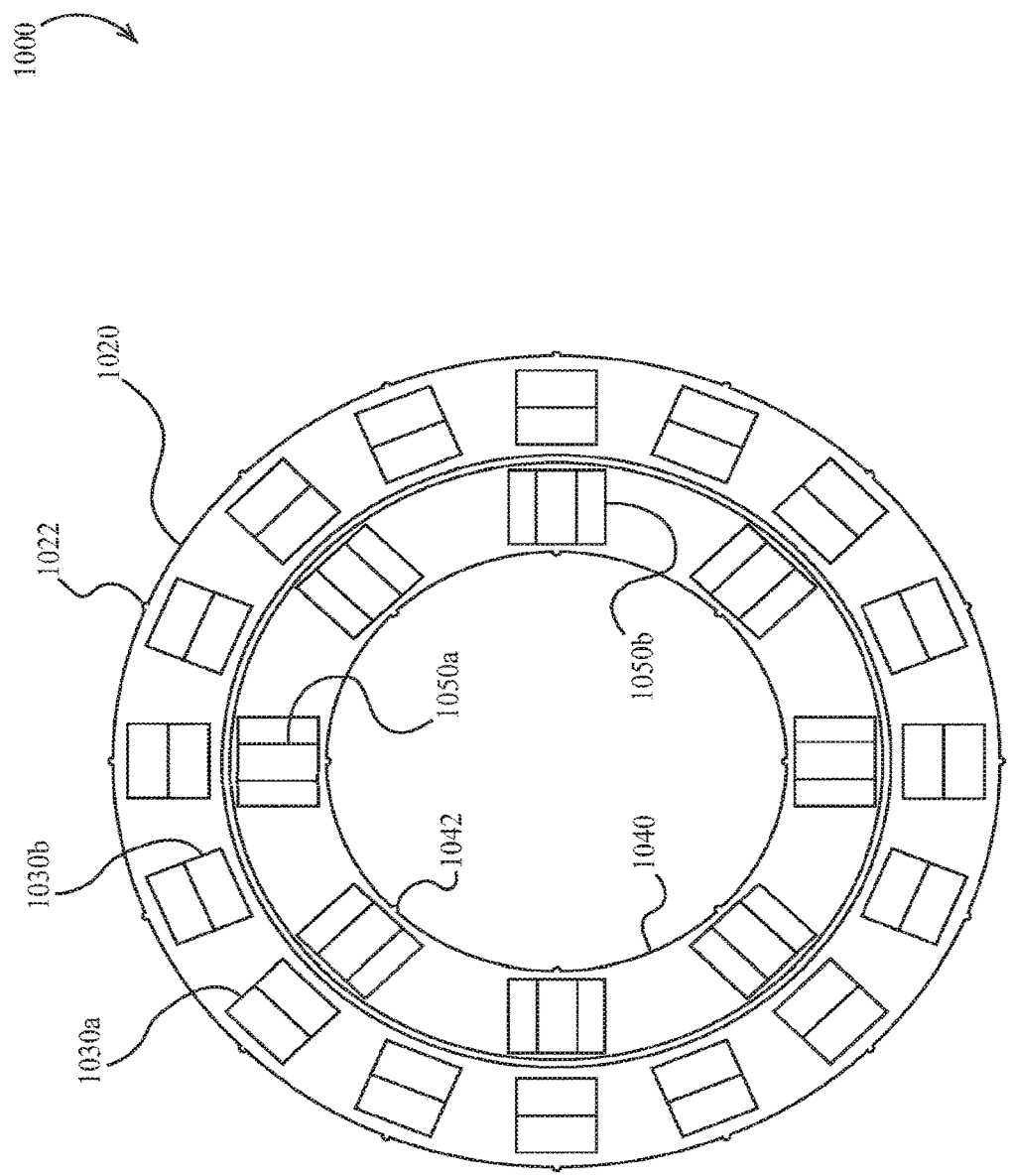
FIG. 10 is an end view of an embodiment of a power generator.

One or more energy generators 1000 are optionally configured and positioned to generate power by the rotation of cylinder 130 about the shaft 200'. Turning to FIG. 10, an embodiment of an energy generator 1000 is illustrated. The energy generator 1000 optionally comprises an inner ring 1040 configured to be supported on (and optionally remain stationary with) shaft 200'. The energy generator 1000 optionally comprises an outer ring 1020 configured to be supported in (e.g., press-fit into) and optionally rotate with the cylinder 130. In some embodiments, protuberances 1022, 1042 or roughness elements or other elements are provided on the inner surface of inner ring 1040 and/or on the outer surface of outer ring 1020, respectively. A plurality of radially arranged magnets 1030 (e.g., permanent magnets such as neodymium magnets, etc.) are optionally supported in the outer ring 1020. A plurality of radially arranged electromagnetic coils 1050 (e.g., conductive coils such as copper coils). In operation, rotation of the outer ring 1020 with the cylinder 130 creates energy which is optionally transmitted to an energy storage device (e.g., battery, capacitor) and/or a power-consuming component of the system 700). In some embodiments, energy generation pulses are also transmitted and/or processed by the system 700 to determine a number of rotations and/or a rotational speed of the cylinder 130. In some embodiments, one or more clamps 1010 are positioned to secure the outer ring 1040 to the cylinder 130.

One or more rotation sensors are optionally provided to detect a rotational speed and/or number of rotations of the cylinder 130. In some embodiments, a signal generated by the energy generator 1000 is used to determine the speed and/or number of rotations of cylinder 130 such that the energy generator 1000 may be considered a rotation sensor. In other embodiments, a different or additional rotation sensor (e.g., Hall effect sensor, etc.) is provided.

In some embodiments, the rotational speed of the cylinder 130 is compared to a belt speed (e.g., measured or assumed belt speed) in order to estimate a current cylinder diameter and/or current cylinder wear percentage. For example, in some embodiments an adjustment factor based on the comparison between the cylinder rotational speed and belt speed may be applied to a nominal cylinder diameter in order to determine a current cylinder diameter. A percentage wear of the cylinder 130 may be determined by dividing the current cylinder diameter by the nominal cylinder diameter. The calculation steps described herein may be performed by a processor connected to the idler or remote from the idler.

Figure 9:
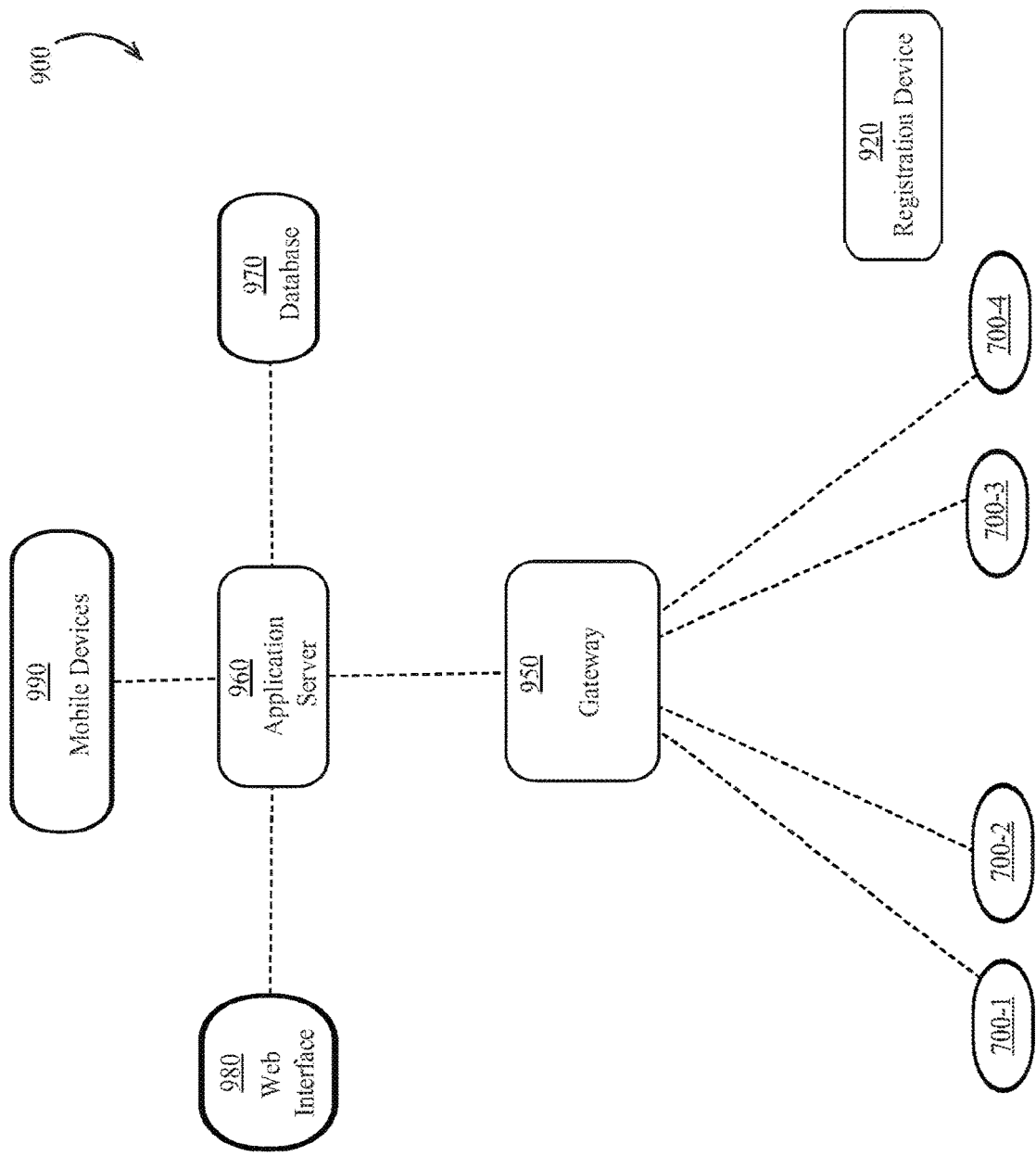
FIG. 9 illustrates an idler network monitoring system.

Referring to FIG. 9, an idler network monitoring system 900 (which may also be referred to as a conveyor monitoring system) is illustrated schematically. In some embodiments, a plurality of systems 700 (e.g., transmitters 605 thereof) are in data communication with communication gateway 950 such as a LoRaWAN gateway, the specifications of which are provided by the LoRa Alliance of Freemont, California. In other embodiments the gateway 950 may be replaced with or supplemented by another communication device such as a WiFi access point. The gateway 950 is optionally in data communication (e.g., via an Internet connection) with an application server 960 (e.g., cloud-based application server). The application server 960 optionally provides data and/or analysis (e.g., failure analysis, diagnostics, etc.) to a web interface 980, a mobile device 990, and/or to a database 970 (e.g., cloud-based database 970).

In some embodiments, the application server 960 (or other system or device) receives one or more idler-related measurements described herein (e.g., one or more of the measurements carried out by system 700). The application server 960 optionally comprises or makes use of an algorithm (e.g., machine learning algorithm, artificial intelligence algorithm, neural network algorithm, deep learning algorithm, JSON interface, etc.) to predict an idler-related diagnostic (e.g., maintenance interval, failure event, failure event time, first component to fail, etc.) based on the idler-related measurements based on measurements. In some embodiments, the application server identifies an existing idler failure based on one or more idler-related measurements (e.g., temperature, idler rotation speed relative to belt speed or nominal idler rotation speed, shaft load, etc.).

In some embodiments, a registration device 920 (e.g., including a scanner, camera, etc.) is used to register the idler (e.g., by scanning or taking an image of the identifier 810). In some embodiments, the registration device 920 includes a global positioning (GPS) system or device and optionally identifies the location of each idler upon registration. The registration device is optionally in data communication with the system 900 (e.g., via the gateway, web interface, or other component).

Figure 12:
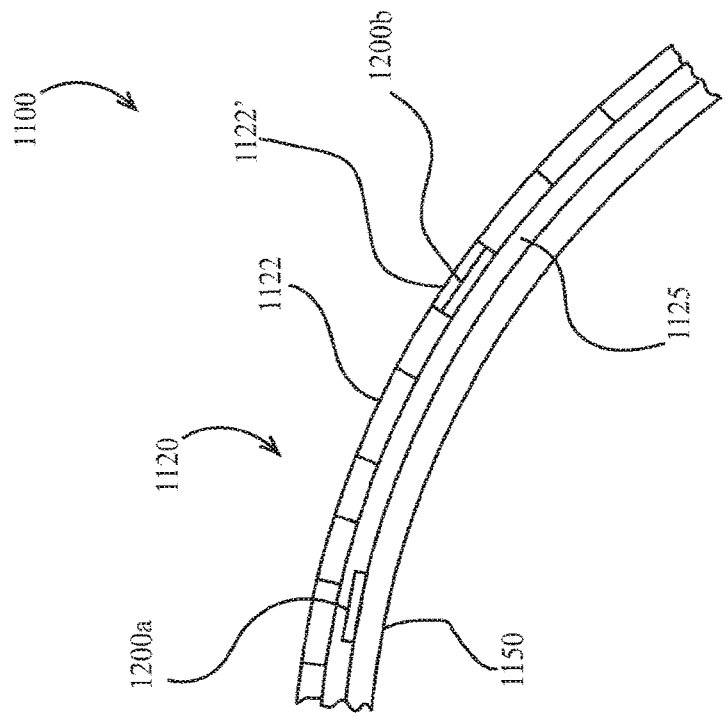
FIG. 12 illustrates detail area A of FIG. 11.
Figure 11:
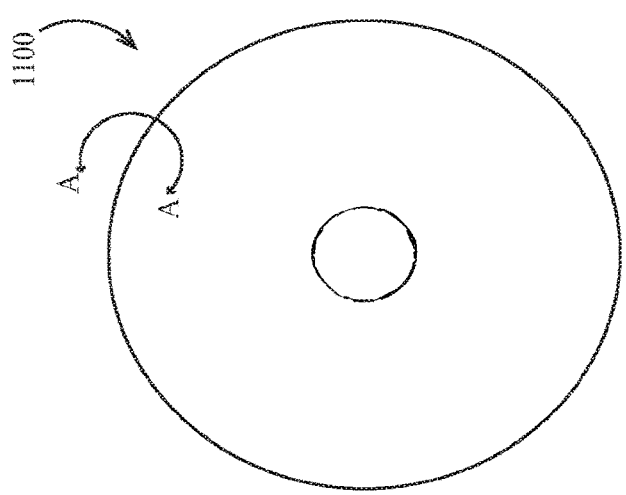
FIG. 11 is a side elevation view of an embodiment of a conveyor pulley.

Referring to FIGS. 11 and 12, in some embodiments a pulley 1100 is optionally provided with one or more load cells 1200 for measuring loads applied to the pulley. In some embodiments the pulley 1100 includes a cylinder 1150 (e.g., metal or other material) having a surface 1125 (e.g., rubber or other material) supported thereon. In some embodiments, the surface 1125 supports one or more radially outwardly extending lagging elements 1122 (e.g., ceramic, rubber or other material). In some embodiments, one or more load cells 1200*a* are disposed on the cylinder 1150 (e.g., beneath the surface 1125). In some embodiments, one or more load cells 1200*b* are disposed between the surface 1125 and an optionally modified lagging element 1122'. In some embodiments, the pulley 1100 includes a wireless transmitter (not shown) in data communication with a load cell associated with said pulley; in some embodiments the wireless sensor associated with the pulley is in data communication with a gateway or other communication device of a conveyor monitoring system such as the system 900.

In some embodiments, the monitoring systems described herein are configured to continuously monitor sensor output and continuously report sensor output or processed sensor output. In some embodiments, the monitoring systems described herein are configured to continuously monitor sensor output but only to report sensor output or processed sensor output at scheduled intervals (e.g., 10 seconds, 30 seconds, 1 minute, 5 minutes, 10 minutes, 30 minutes, 1 hour, 3 hours, 1 day, etc.). In some embodiments, the monitoring systems described herein are configured to continuously monitor sensor output but only to report sensor output or processed sensor output when one or more sensor outputs or processed sensor outputs exceed a threshold (e.g., threshold temperature, threshold vibration level, etc.). In some embodiments, the monitoring systems described herein are configured to only power on and monitor sensor output at scheduled intervals and to report sensor outputs or processed sensor outputs at such intervals or at different intervals.

Figure 13:
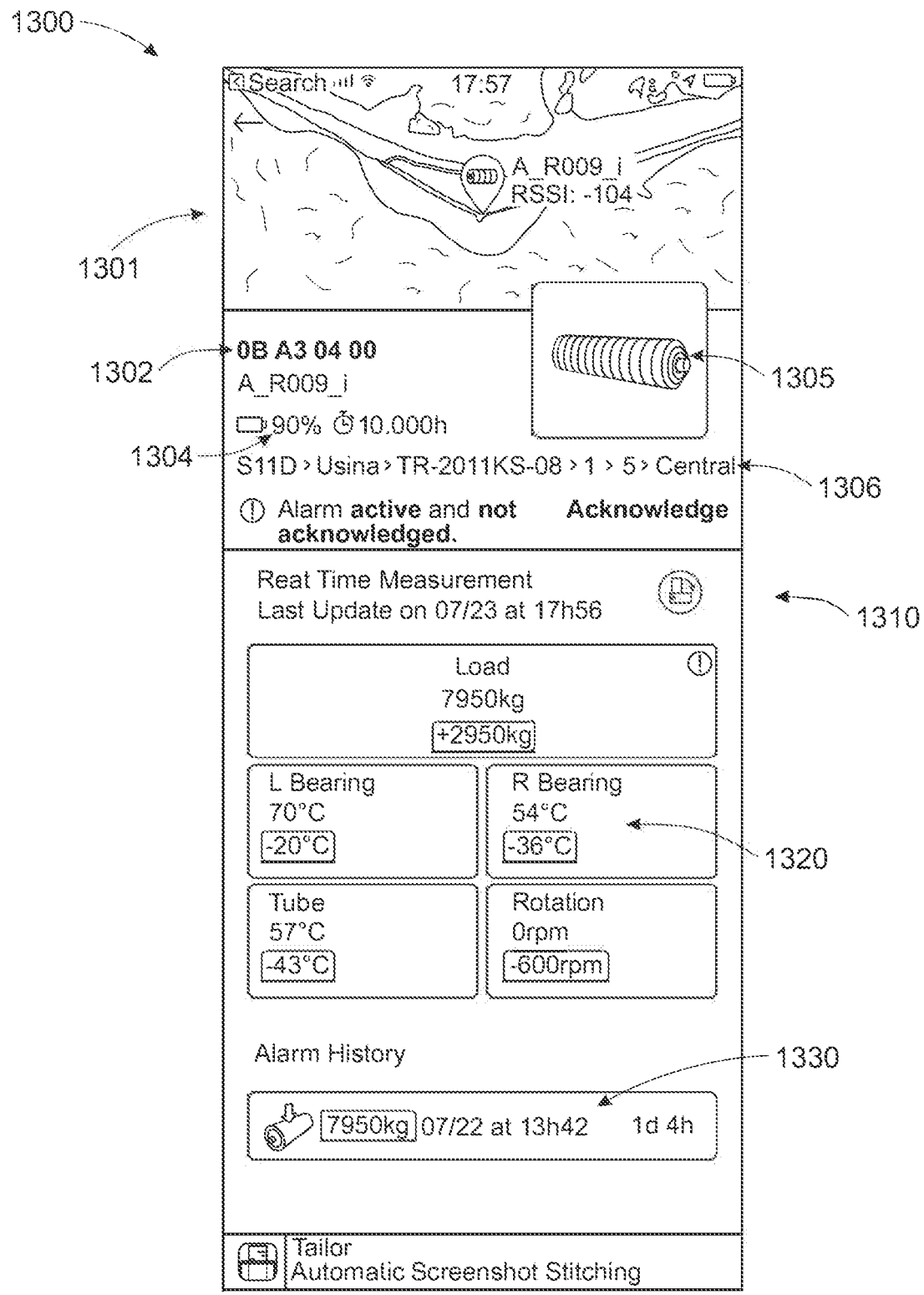
FIG. 13 illustrates an embodiment of a user interface screen.
Figure 14:
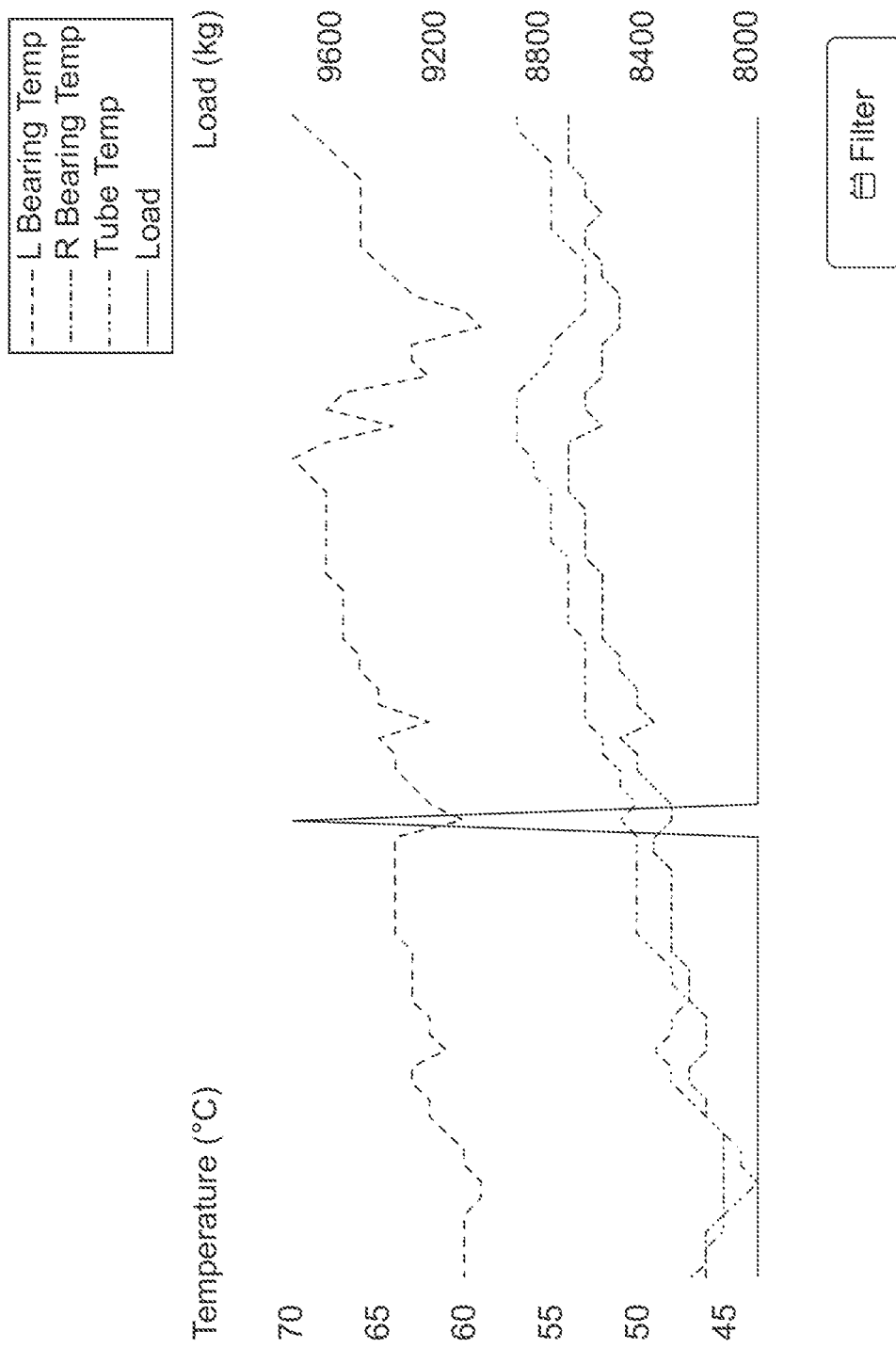
FIG. 14 illustrates an embodiment of a user interface screen.

Referring to FIG. 13, in some embodiments a user interface (e.g., mobile device 990 or web interface 980, see FIG. 9) is configured to display a summary screen 1300 including various monitoring data generated by system 700. In some embodiments a map 1301 illustrates a location of one or more idlers associated with system 700, which may be superimposed on an aerial image of a conveyor and/or site. An image 1305 of the idler is optionally displayed. A serial number 1302 of the idler is optionally displayed. A battery life indicator 1304 may be displayed. A structural menu 1306 is optionally used to indicate the location of and/or navigate to a given idler on a conveyor (e.g., by selecting a site, conveyor, section of the conveyor, and/or which idler in the idler assembly is of interest). An alarm acknowledgement interface 1310 optionally indicates whether an alarm related to the idler has been acknowledged and/or allows the user to acknowledge the alarm. A real time monitoring display 1320 optionally displays one or more idler measurements (e.g., load, bearing temperature, rotational speed, cylinder ambient temperature, cylinder inner surface temperature, vibration level, etc.). In some embodiments selecting one or more idler measurements in the display 1320 causes the interface to display a graph 1400 of historical values of one or more idler measurements (see FIG. 14). In some embodiments, an alarm history 1330 is displayed indicating which measurements for the idler have set off threshold alarms. In some embodiments, a summary display 1500 (see FIG. 15) may be accessed including summarized measurement displays 1510, 1520, 1530 for a plurality of idlers.

In some embodiments, the user interface displays a predicted idler-related diagnostic (e.g., maintenance interval, failure event, failure event time, first component to fail, etc.) based on the idler-related measurements. In some embodiments, the user interface displays an indication (e.g., alarm) corresponding to an existing idler failure determined based on one or more idler-related measurements (e.g., temperature, idler rotation speed relative to belt speed or nominal idler rotation speed, shaft load, etc.).

Ranges recited herein are intended to inclusively recite all values within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents.

The invention claimed is:

1. A monitoring system configured to monitor a plurality of conveyor idlers, each conveyor idler having a cylinder with an inner surface and an outer surface, the cylinder rollingly supported on a shaft by a plurality of bearings, the monitoring system comprising:
   a first temperature sensor associated with each conveyor idler of the plurality of conveyor idlers, said first temperature sensor configured to measure a first temperature of a first bearing of each conveyor idler;
   a speed sensor associated with each conveyor idler, said speed sensor configured to measure a rotational speed of each conveyor idler;
   a vibration sensor associated with each conveyor idler, each vibration sensor configured to measure a vibration of each conveyor idler;
   a wireless receiver in data communication with an application server, said application server being configured to predict, based on said rotational speed, said vibration, and said first temperature, a future predicted failure time for each conveyor idler;

a transmitter associated with each conveyor idler and configured to transmit data including said first temperature, said rotational speed and said vibration to said wireless receiver;

an energy generator associated with each conveyor idler at least partly powered by rotation of each conveyor idler, said energy generator configured to power at least one of said transmitter, said first temperature sensor, said speed sensor, and said vibration sensor; and a display having a user interface, said display being configured to display current values of said first temperature, said rotational speed, and said vibration on said user interface, said display being configured to display on said user interface a predictive failure indication associated with the first one of said plurality of conveyor idlers predicted to fail, said failure indication based on said future predicted failure time for each conveyor idler, wherein said application server is configured to predict said future predicted failure time using an artificial intelligence algorithm.

2. The monitoring system of claim 1, further comprising: a second temperature sensor configured to measure a second temperature, wherein said data includes said second temperature.

3. The monitoring system of claim 2, wherein said second temperature sensor is associated with a second bearing of each conveyor idler, wherein said second temperature comprises a temperature of each second bearing.

4. The monitoring system of claim 2, wherein said second temperature comprises an ambient air temperature inside the cylinder.

5. The monitoring system of claim 1, wherein said display is configured to display historical values of at least one of said first temperature, said vibration, and said rotational speed.

6. The monitoring system of claim 1, further comprising: a processor in data communication with said first temperature sensor, said vibration sensor, and said speed sensor.

7. The monitoring system of claim 6, further comprising: a real time clock in data communication with said processor.

8. The monitoring system of claim 6, further comprising: a memory in data communication with said processor.

9. The monitoring system of claim 8, wherein said display is configured to display historical values of at least one of said first temperature, said vibration, and said rotational speed.

* * * * *